United States Patent
Lu

(10) Patent No.: US 10,505,440 B1
(45) Date of Patent: Dec. 10, 2019

(54) ACTIVE SNUBBER FOR SWITCHING POWER CONVERTER

(71) Applicant: Dialog Semiconductor (UK) Limited, London (GB)

(72) Inventor: Kuan-Ta Lu, Tainan (TW)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/119,259

(22) Filed: Aug. 31, 2018

(51) Int. Cl.
*H02M 1/34* (2007.01)
*H02M 3/158* (2006.01)

(52) U.S. Cl.
CPC .............. *H02M 1/34* (2013.01); *H02M 3/158* (2013.01); *H02M 3/1582* (2013.01); *H02M 2001/342* (2013.01)

(58) Field of Classification Search
CPC .... H02M 3/156; H02M 3/158; H02M 3/1582; H02M 1/34; H02M 2001/342; H02M 2001/346
See application file for complete search history.

(56) References Cited

U.S. PATENT DOCUMENTS

| | | | | |
|---|---|---|---|---|
| 5,736,842 A * | 4/1998 | Jovanovic | ................ | H02M 1/34 323/222 |
| 6,771,521 B1 * | 8/2004 | Xiong | ..................... | H02M 1/34 363/21.06 |
| 2007/0052397 A1 * | 3/2007 | Thompson | .............. | G05F 1/613 323/223 |
| 2008/0094866 A1 * | 4/2008 | Bauman | ................... | H02M 1/34 363/50 |
| 2012/0223667 A1 * | 9/2012 | Wang | ................... | H02M 3/1588 318/768 |
| 2013/0214754 A1 * | 8/2013 | Chiang | ................... | G05F 1/565 323/285 |
| 2014/0313627 A1 * | 10/2014 | Li | ........................... | H02M 1/34 361/91.5 |
| 2018/0262101 A1 * | 9/2018 | Ishikura | .................. | H02M 1/08 |
| 2019/0036445 A1 * | 1/2019 | Muto | ...................... | H02M 1/08 |

OTHER PUBLICATIONS

"Active Clamp Boost Converter with Switched Capacitor and Coupled Inductor," by Yi Zhao et al., 2010 Twenty-Fifth Annual IEEE Applied Power Electronics Conference and Exposition (APEC), Feb. 21-25, 2010, pp. 801-806.
Texas Instruments, "TPS6125x 3.5-MHz High Efficiency Step-Up Converter in Chip Scale Packaging," SLVSAGSG—Sep. 2011—Revised Jun. 2016, Found: http://www.ti.com/lit/ds/symlink/tps61256.pdf, 37 pages.

* cited by examiner

*Primary Examiner* — Yusef A Ahmed
*Assistant Examiner* — Shahzeb K Ahmad
(74) *Attorney, Agent, or Firm* — Saile Ackerman LLC; Stephen B. Ackerman

(57) ABSTRACT

A switching power converter and a method for receiving an input power at an input node and outputting an output power at an output node is presented. The switching power converter has a high-side switching device coupled between the input node and the output node, a low-side switching device coupled between the input node and a predetermined voltage level, and an active snubber circuit for suppressing voltage peaks at the input node. The active snubber circuit has a first capacitor coupled to the output node. The first capacitor is charged during a first dead time after the low-side switching device has been switched OFF and before the high-side switching device is switched ON.

16 Claims, 7 Drawing Sheets

ACTIVE SNUBBER FOR SWITCHING POWER CONVERTER

TECHNICAL FIELD

This disclosure relates to switching power converters (DC-DC converters) for receiving an input power at an input node and outputting an output power at an output node, and to corresponding methods of receiving an input power at an input node and outputting an output power at an output node, using switching power converters. This disclosure particularly relates to switching power converters comprising active snubber circuits and to corresponding methods. This disclosure is particularly applicable to (synchronous) boost converters or buck-boost converters.

BACKGROUND

In switching power converters, such as synchronous boost converters or buck-boost converters, there is a high peak voltage at the V_LX node (input node) during the first dead time (DT1) when the low-side switching device has turned off an the high-side switching device has not yet turned on. The peak V_LX(peak) of this voltage depends on the output voltage and the parasitic inductance on the printed circuit board (PCB). The parasitic inductance and the inductor current dominate the V_LX (peak) during the first dead time DT1. This V_LX(peak) might damage the low-side switching device if the V_LX (peak) is higher than the breakdown voltage of the low-side switching device, especially if the parasitic inductance and the inductor current are both high. The peak voltage V_LX(peak) also impacts the life time and reliability of the low-side switching device.

One solution to this issue would be to use a low-side switching device with a higher breakdown voltage. However, higher voltage devices typically have a higher on-state resistance, which means that the area of the low-side switching device would have to be much larger to achieve the same converter efficiency.

SUMMARY

There is a need for switching power converters that reduce the peak of the voltage at the V_LX node during the first dead time and for corresponding methods of power conversion by switching power converters that reduce the peak of the voltage at the LX node during the first dead time. In view of some or all of these needs, the present disclosure proposes a switching power converter for receiving an input power at an input node and outputting an output power at an output node, and a method, using a switching power converter, of receiving an input power at an input node and outputting an output power at an output node, having the features of the respective independent claims.

An aspect of the disclosure relates to a switching power converter (switching mode power converter) for receiving an input power at an input node and outputting an output power at an output node. The switching power converter may comprise a high-side switching device coupled between the input node and the output node. The high-side switching device may be a transistor, such as a FET (e.g., p-channel FET, P-FET), or MOSFET (e.g., PMOS). The switching power converter may further include a low-side switching device coupled between the input node and a predetermined voltage level. The low-side switching device may be a transistor, such as a FET (e.g., n-channel FET, N-FET), or MOSFET (e.g., NMOS). The predetermined voltage level may be ground, for example. The switching power converter may yet further include an active snubber circuit for suppressing voltage peaks at the input node. The active snubber circuit may include a first capacitor coupled to the output node. The first capacitor may be referred to as a snubber capacitor or internal capacitor. The first capacitor may be charged during a first dead time after the low-side switching device has been switched OFF and before the high-side switching device is switched ON. The switching power converter may further include a control circuit for controlling switching operation of the high-side switching device and the low-side switching device.

In the proposed switching power converter the first capacitor is charged during the first dead time. The charging current for the first capacitor reduces the inductor current that flows through the parasitic inductance on the printed circuit board of the switching power converter, and thus reduces a peak value of a voltage at the input node. Since this peak value is reduced, the low-side switching device can have a lower breakdown voltage, which applies a smaller area cost for the low-side switching device at a given converter efficiency. Likewise, life time and reliability of the low-side switching device can be improved. Also, it is not necessary to couple a discrete external capacitor to the output node to achieve this aim, which implies a reduction of overall cost.

In some embodiments, the first capacitor may be discharged during an ON-phase of the low-side switching device. Accordingly, discharging the first capacitor does not impact the voltage at the input node and moreover the first capacitor is available for being charged again and for reducing the peak value of the voltage at the input node during the subsequent first dead time.

In some embodiments, the active snubber circuit may include a series connection of the first capacitor and a first switch coupled between the input node and the predetermined voltage level (e.g., ground). The first switch may be a transistor switch, such as a FET (e.g., n-channel FET, N-FET), or MOSFET (e.g., NMOS). The first switch may be switched in dependence on a voltage level at the input node. For example, the first switch may be switched on if the voltage level at the input node exceeds a predetermined voltage threshold. The predetermined voltage threshold may be or depend on a threshold voltage of a transistor switch that implements the first switch, for example. Thereby, charging of the first capacitor can be commenced at a suitable timing, to optimally reduce the rise of the voltage at the input node.

In some embodiments, the first switch may be switched off if the low-side switching device is switched on. In other words, the first switch may be switched off during ON-phases of the low-side switching device. This ensures that discharging the first capacitor does not impact the voltage at the input node and that the first capacitor is available for reducing the peak value of the voltage at the input node also during the subsequent first dead times.

In some embodiments, the first switch may be a first transistor switch. The switching power converter may further include a second capacitor coupled between the input node and a control terminal of the first transistor switch. The second capacitor may be referred to as a tracking capacitor that tracks the voltage level at the input node, or as a sense capacitor.

In some embodiments, the switching power converter may further include a second switch for switchably coupling an intermediate node between the first capacitor and the first switch to the output node, so that the first capacitor is discharged if the second switch is switched on. The second switch may be switched synchronously with the low-side switching device. The second switch may be a transistor switch, such as a FET (e.g., p-channel FET, P-FET), or MOSFET (e.g., PMOS). This allows to efficiently and reliable discharge the first capacitor at an appropriate timing.

In some embodiments, the second switch may be a second transistor switch. A control terminal of the second transistor switch may be coupled to a control terminal of the low-side switching device through a level shifter (e.g., lv to hv level shifter).

In some embodiments, the first switch may be a first transistor switch. The switching power converter may further include a third switch coupled between a control terminal of the first transistor switch and the predetermined voltage level (e.g., ground). The third switch may be switched synchronously with the low-side switching device. The third switch may be a transistor switch, such as a FET (e.g., n-channel FET, N-FET), or MOSFET (e.g., NMOS). This ensures that the first switch is switched off while the first capacitor is discharged, to ensure reliable discharging of the first capacitor.

In some embodiments, the third switch may be a third transistor switch. A control terminal of the third transistor switch may be coupled to a control terminal of the low-side switching device.

In some embodiments, the switching power converter may be one of a (synchronous) boost converter or a buck-boost converter.

Another aspect of the disclosure relates to a method, using a switching power converter, of receiving an input power at an input node and outputting an output power at an output node. The switching power converter may include a high-side switching device coupled between the input node and the output node. The switching power converter may further include a low-side switching device coupled between the input node and a predetermined voltage level (e.g., ground). The switching power converter may yet further include an active snubber circuit with a first capacitor coupled to the output node. The method may include charging the first capacitor during a first dead time after the low-side switching device has been switched off and before the high-side switching device is switched on, so that voltage peaks at the input node are suppressed. The method may further include controlling switching operation of the high-side switching device and the low-side switching device, for example by a control circuit.

In some embodiments, the method may further include discharging the first capacitor during an ON-phase of the low-side switching device.

In some embodiments, the active snubber circuit may include a series connection of the first capacitor and a first switch coupled between the input node and the predetermined voltage level. Then, the method may further include switching the first switch in dependence on a voltage level at the input node.

In some embodiments, the first switch may be switched on if the voltage level at the input node exceeds a predetermined voltage threshold.

In some embodiments, the first switch may be switched off if the low-side switching device is switched on.

In some embodiments, the first switch may be a first transistor switch. Then, the method may further include tracking a voltage level at the input node by a second capacitor coupled between the input node and a control terminal of the first transistor switch.

In some embodiments, the switching power converter may further include a second switch for switchably coupling an intermediate node between the first capacitor and the first switch to the output node, so that the first capacitor is discharged if the second switch is switched on. Then, the method may further include switching the second switch synchronously with the low-side switching device.

In some embodiments, the second switch may be a second transistor switch. A control terminal of the second transistor switch may be coupled to a control terminal of the low-side switching device through a level shifter (e.g., lv to hv level shifter).

In some embodiments, the first switch may be a first transistor switch. The switching power converter may further include a third switch coupled between a control terminal of the first transistor switch and the predetermined voltage level (e.g., ground). Then, the method may further include switching the third switch synchronously with the low-side switching device.

In some embodiments, the third switch may be a third transistor switch. A control terminal of the third transistor switch may be coupled to a control terminal of the low-side switching device.

In some embodiments, the switching power converter may be one of a synchronous boost converter or a buck-boost converter.

It will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods.

It is also understood that in the present document, the term "couple" or "coupled" refers to elements being in electrical communication with each other, whether directly connected e.g., via wires, or in some other manner (e.g., indirectly). Notably, one example of being coupled is being connected.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a switching power converter according to embodiments of the disclosure, FIG. 2 schematically illustrates examples of variations over time of drive signals, voltages, and currents in the switching power converter of FIG. 1, FIG. 3 schematically illustrates another example of a switching power converter according to embodiments of the disclosure, FIG. 4 schematically illustrates an example of a time variation of a voltage at an input node of the switching power converter of FIG. 1, FIG. 5 schematically illustrates a comparative example of a switching power converter, FIG. 6 schematically illustrates examples of variations over time of drive signals, voltages, and currents in the switching power converter of FIG. 5, and FIG. 7 schematically illustrates another comparative example of a switching power converter.

DESCRIPTION

As indicated above, identical or like reference numbers in the disclosure indicate identical or like elements, and repeated description thereof may be omitted for reasons of conciseness.

Figure 5:
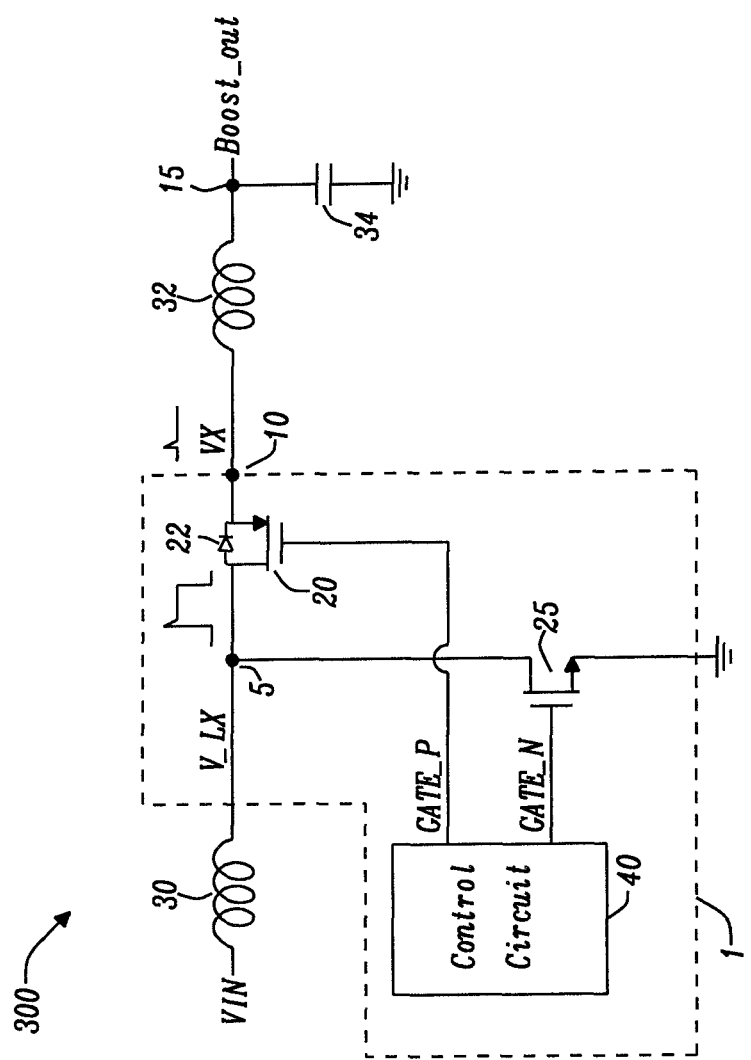
Figure 6:
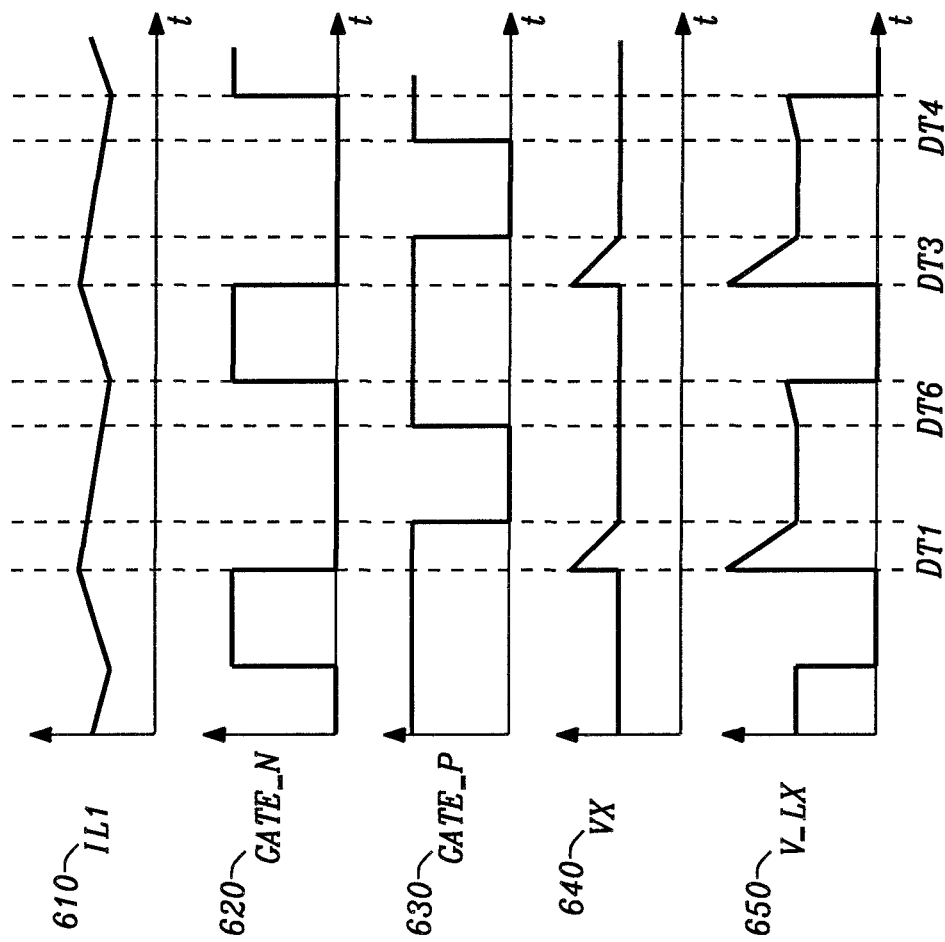

An example of a synchronous boost converter 300 (as an example of a switching power converter) is shown in FIG. 5. Examples of its operating waveforms are shown in FIG. 6.

The switching power converter 300 comprises a high-side switching device 20 coupled between an input node (V_LX or LX node) 5 and an output node (VX or X node) 10. The switching power converter 300 further comprises a low-side switching device 25 coupled between the input node 5 and a predetermined voltage level (e.g., ground). Both the high-side switching device 20 and the low-side switching device 25 operate under control of a control circuit 40 that provides (e.g., generates) a high-side drive signal GATE_P for the high-side switching device 20 and a low-side drive signal GATE_N for the low-side switching device 25. The high-side switching device 20 and the low-side switching device 25 may be transistors, such as field effect transistors (FETs). For example, the high-side switching device 20 may be a p-channel FET (P-FET) and the low-side switching device 25 may be a n-channel FET (N-FET). In particular, the high-side switching device 20 and the low-side switching device 25 may be metal-oxide-semiconductor FETs (MOSFETs), i.e., the high-side switching device 20 may be a p-channel MOS (PMOS) and the low-side switching device 25 may be a n-channel MOSFET (NMOS). In such case, the control circuit 40 may be coupled to respective control terminals (e.g., gates) of the high-side switching device 20 and the low-side switching device 25, to provide the high-side drive signal GATE_P to the control terminal of the high-side switching device 20 and to provide the low-side drive signal GATE_N to the control terminal of the low-side switching device 25.

The switching power converter 300 may further comprise a diode 22 coupled in parallel to the high-side switching device 20 between the input node 5 and the output node 10, oriented to block currents flowing from the output node 10 to the input node 5.

The aforementioned elements of the switching power converter 300 may be arranged on a PCB 1. Coupled to the input node 5 may be an input inductance (e.g., inductor) 30. A parasitic inductance 32 (e.g., on the PCB 1) may be effective at the output node 10. An output capacitance (e.g., capacitor) 34 may be coupled to the output node 10 (i.e., to the parasitic inductance 32), and a voltage Boost_out may be tapped at an intermediate node 15 between the output node 10 and the output capacitance 34 (i.e., between the parasitic inductance 32 and the output capacitance) and may be provided to an electric load (not shown).

Examples of the operating waveforms of the switching power converter 300 are illustrated in FIG. 6. In this figure, graph 610 illustrates an inductor current IL1 flowing through the input inductance 30, graph 620 illustrates the low-side drive signal GATE_N, graph 630 illustrates the high-side drive signal GATE_P, graph 640 illustrates the voltage VX at the output node 10, and graph 650 illustrates the voltage V_LX at the input node 5. As noted above, the first dead time DT1 is that time period during which the low-side switching device 25 has been switched off (low-side drive signal GATE_N has toggled to LOW) and the high-side switching device 20 has not yet been switched on (high-side drive signal GATE_P still HIGH). During DT1, there is a voltage peak in both the voltage VX at the output node 10 and in the voltage V_LX at the input node 5.

Thus, there can a high peak voltage at the V_LX node during the first dead time (Dead Time Zone 1 (DT1), i.e., the time period during which the low-side switching device 25 has been switched off and the high-side switching device 20 has not yet switched on). This peak voltage V_LX(peak) is given by $$V\_LX(\text{peak}) = \text{Boost\_out} + Lp \times dIL1/dt + VF(Dp)$$

where Lp is the parasitic inductance on the PCB 1, IL1 is the inductor current through the input inductance 30, and VF(Dp) is the voltage drop across the diode 22. This inductance Lp and inductor current IL1 dominate the peak voltage V_LX(peak) during the first dead time DT1. As noted above, high peak voltages V_LX(peak) might damage the low-side switching device 25 if the peak voltage is higher than the breakdown voltage (VDS voltage) of the low-side switching device 25. This is the case especially if the parasitic inductance Lp and inductor current IL1 are both high. The peak voltage V_LX(peak) also impacts the life time and reliability of the low-side switching device 25.

Two solutions for addressing this issue are feasible. One solution could be to use a higher voltage N-FET for the low-side switching device 25 which can sustain a higher peak VDS voltage. However higher voltage devices typically have a higher on-state resistance RDSon, which means this N-FET's area would need to be much larger to achieve the same converter efficiency.

Another solution could be to put a small size external "snubbing" capacitor as close to the chip (PCB) as possible to minimize the parasitic inductance between chip and the snubbing capacitor and to reduce the peak voltage V_LX (peak).

Figure 7:
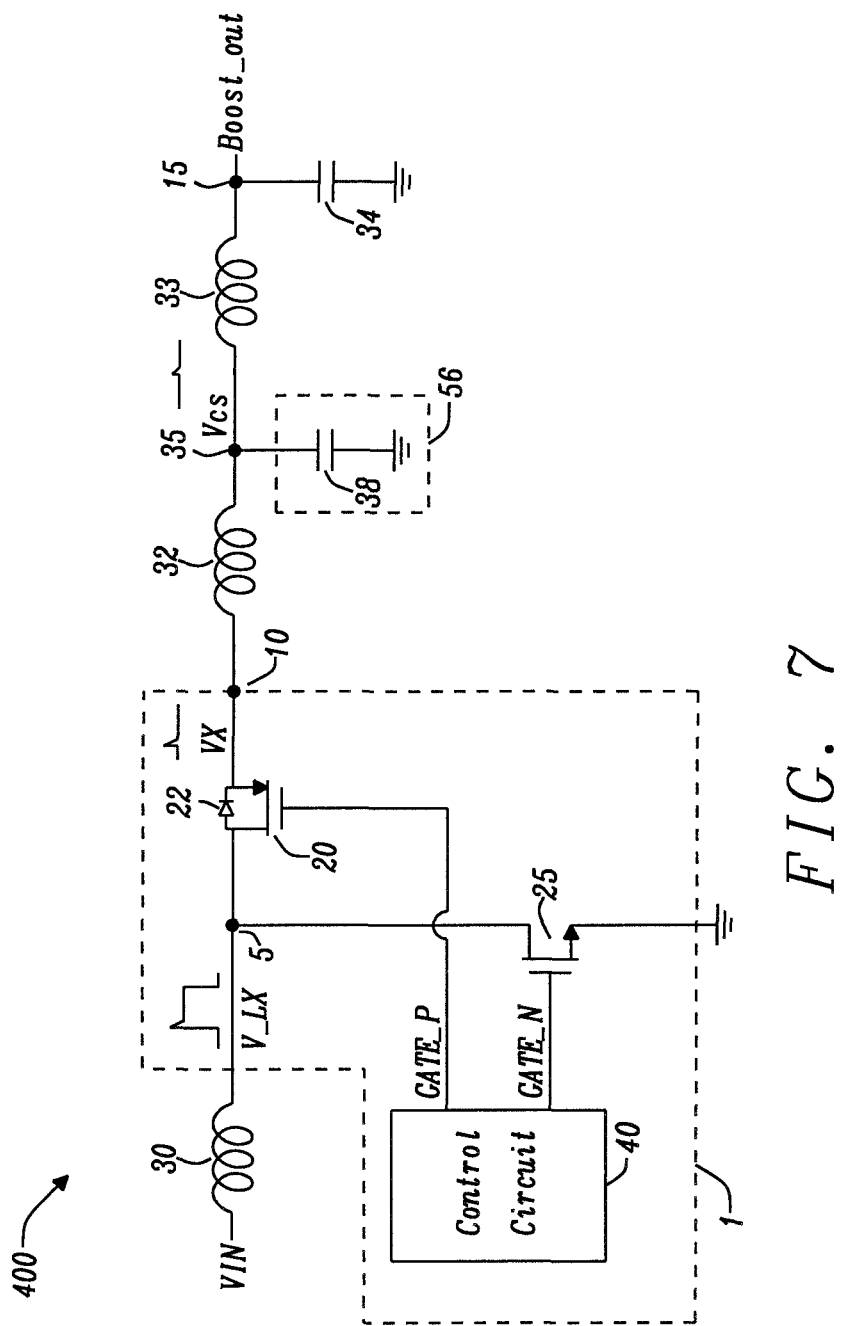

FIG. 7 schematically illustrates an example of a synchronous boost converter 400 (as an example of a switching power converter) that uses this solution. The switching power converter 400 is identical to the switching power converter 300 of FIG. 5, except for that a snubbing capacitor 38 is coupled to the output node 10 (i.e., to the parasitic inductance 32 or intermediate node 35), as close to the PCB 1 as possible. For example, one terminal of the snubbing capacitor 38 may be coupled to the output node 10. The other terminal of the snubbing capacitor 38 may be coupled to ground. In this case, a second parasitic inductance 33 is present between the first terminal of the snubbing capacitor and the intermediate node 15, to which an electric load could be coupled. However, the parasitic inductance 32 that impacts the peak voltage V_LX(peak) can be reduced by providing the snubbing capacitor 38. On the downside, providing the snubbing capacitor 38 as a discrete capacitor will add to the bill of materials (BOM) cost of the switching power converter 400.

In view thereof, the present disclosure seeks to reduce the LX peak voltage of a switching power converter (e.g., synchronous boost converter or buck-boost converter) during the first dead time DT1.

To this end, switching power converters according to embodiments of the disclosure may include an active snubber circuit placed at the VX node (output node). This active snubber circuit may include any, some, or all of an internal capacitor (first capacitor), a sensing or tracking capacitor (second capacitor), and a level shifter (e.g., lv to hv level shifter). Additionally, the active snubber circuit may include any, some, or all of a charging switch (first switch) coupled (e.g., connected) between ground and the sensing capacitor, a discharging switch (second switch) controlled by the low-side drive signal GATE_N through the lv to hv level shifter, for discharging the internal capacitor, and a third switch controlled by the low-side drive signal GATE_N for turning off the charging switch during the discharge of the internal capacitor. The sensing capacitor can be configured to detect the LX voltage V_LX and to turn on the charging switch at the onset of the rising of the LX voltage V_LX, to thereby charge the internal capacitor. Afterwards, after the first dead time DT1, the internal capacitor can be discharged again by the second switch.

Using such active snubber circuit, the low-side N-FET layout area can be reduced, since it allows to use low-side N-FETs with lower VDS breakdown voltages. Moreover, parasitic inductance tolerance on the PCB will be higher. Additionally, costs can be saved since there is no need for an extra discrete snubber capacitor coupled to the PCB.

Figure 4:
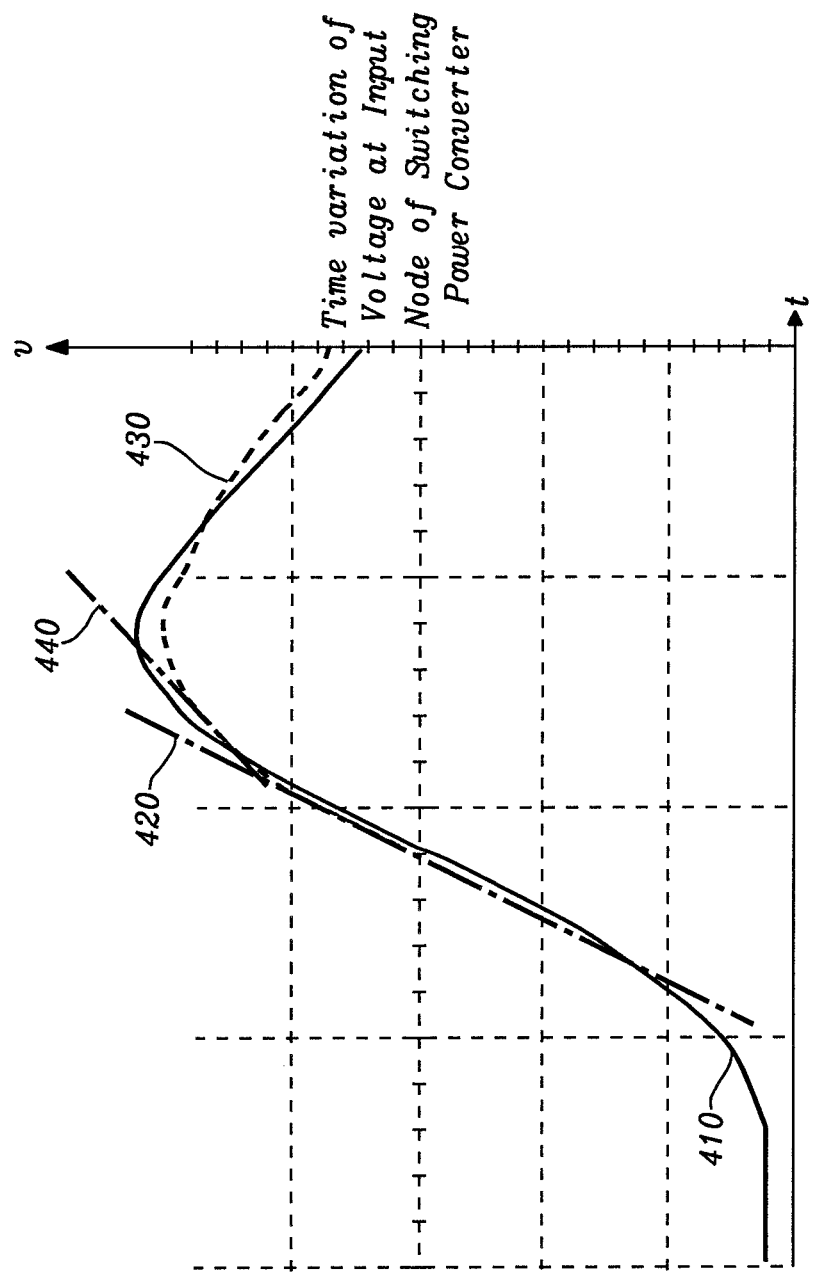

Another effect of using the active snubber circuit is that the LX voltage V_LX now will have a two stage slope during the rising edge, as compared to a constant slope in the case without active snubber circuit. This is schematically illustrated in FIG. 4, in which curve 410 (solid line (is an example of the LX voltage V_LX as a function of time without active snubber circuit and curve 430 (dashed line) is an example of the LX voltage V_LX as a function of time when the active snubber circuit is used. As can be seen, curve 410 has a single slope 420 (dotted line) during the rising edge, whereas curve 430 has a first slope (same as slope 420 for curve 410) and a second slope 440 (dash-dotted line) towards the peak value of the LX voltage V_LX.

Next, examples of switching power converters according to embodiments of the disclosure will be described in more detail.

Figure 1:
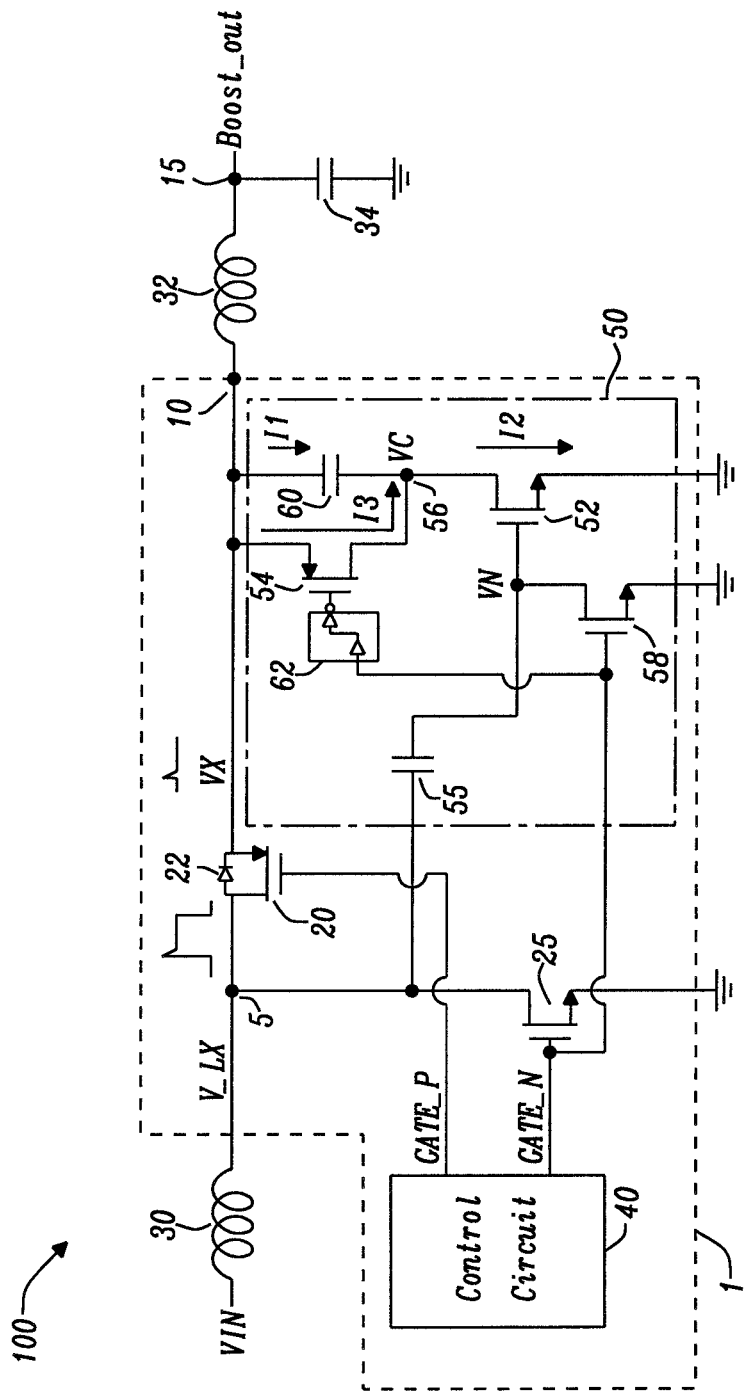
Figure 2:
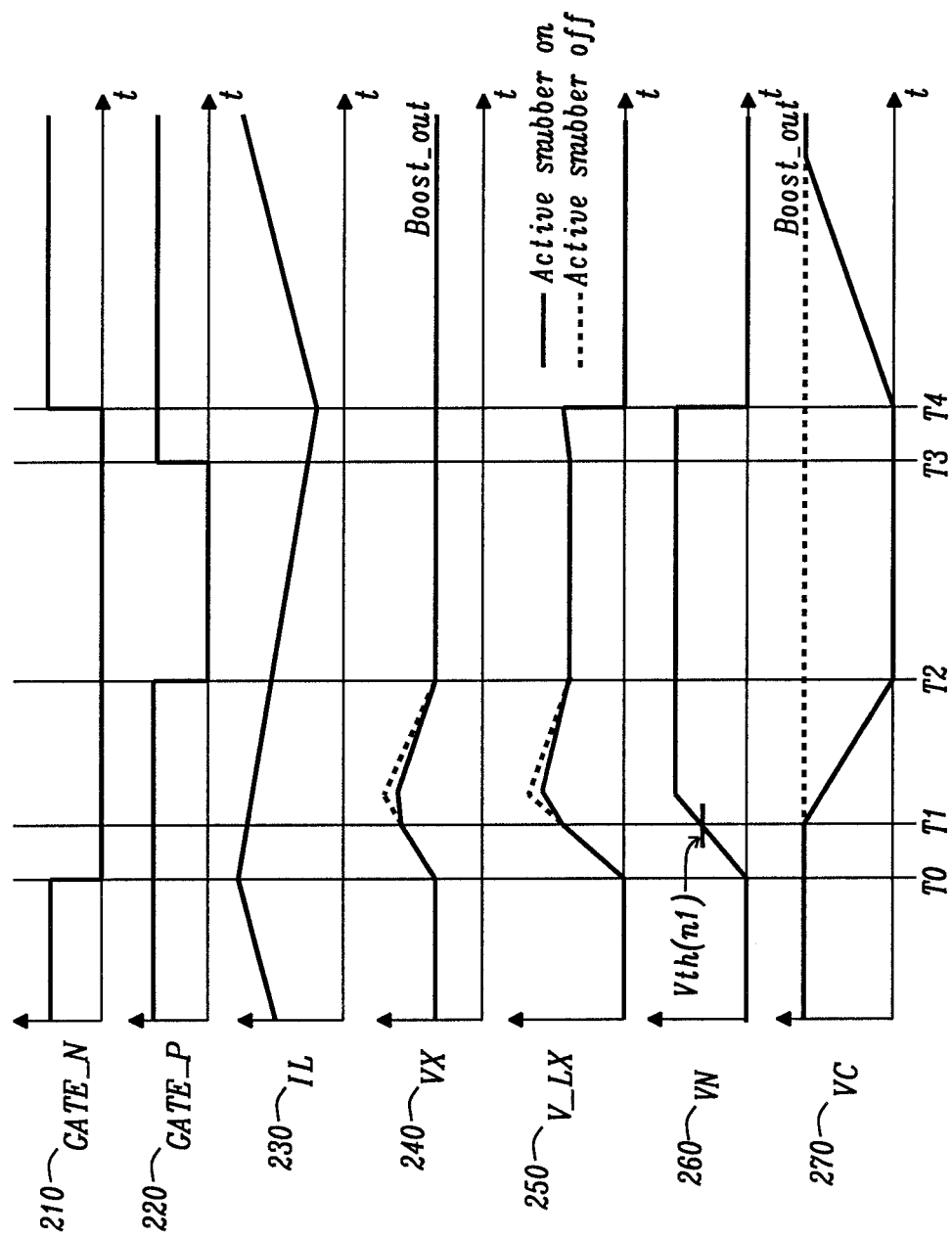

FIG. 1 schematically illustrates an example of a (synchronous) boost converter 100 (as an example of a switching power converter) according to embodiments of the disclosure. Examples of its operating waveforms are shown in FIG. 2.

The switching power converter 100 receives an input power at an input node (V_LX or LX node) 5 and outputs an output power at an output node (VX or X node) 10. Similarly to the switching power converter 300 of FIG. 5, the switching power converter 100 comprises a high-side switching device 20 coupled between the input node 5 and the output node 10. The switching power converter 100 further comprises a low-side switching device 25 coupled between the input node 5 and a predetermined voltage level (e.g., ground). Both the high-side switching device 20 and the low-side switching device 25 operate under control of a control circuit 40 that provides (e.g., generates) a high-side drive signal GATE_P for the high-side switching device 20 and a low-side drive signal GATE_N for the low-side switching device 25. The high-side switching device 20 and the low-side switching device 25 may be transistors, such as FETs. For example, the high-side switching device 20 may be a P-FET and the low-side switching device 25 may be a N-FET. In particular, the high-side switching device 20 and the low-side switching device 25 may be MOSFETs, i.e., the high-side switching device 20 may be a PMOS and the low-side switching device 25 may be a NMOS. In such case, the control circuit 40 may be coupled to respective control terminals (e.g., gates) of the high-side switching device 20 and the low-side switching device 25, to provide the high-side drive signal GATE_P to the control terminal of the high-side switching device 20 and to provide the low-side drive signal GATE_N to the control terminal of the low-side switching device 25.

The switching power converter 100 may further comprise a diode 22 coupled in parallel to the high-side switching device 20 between the input node 5 and the output node 10, oriented to block currents flowing from the output node 10 to the input node 5.

The aforementioned elements of the switching power converter 100 may be arranged on a PCB 1. Coupled to the input node 5 may be an input inductance (e.g., inductor) 30. A parasitic inductance 32 (e.g., on the PCB 1) may be effective at the output node 10. An output capacitance (e.g., capacitor) 34 may be coupled to the output node (i.e., to the parasitic inductance 32), and a voltage Boost_out may be tapped at an intermediate node 15 between the output node 10 and the output capacitance 34 (i.e., between the parasitic inductance 32 and the output capacitance 34) and may be provided to an electric load (not shown).

In addition, the switching power converter 100 comprises an active snubber circuit 50 at the output node (VX node) 10 (e.g., coupled to the output node 10). The active snubber circuit 50 suppresses voltage peaks at the input node 5 (and likewise at the output node 10), e.g., during the first dead time DT1.

The active snubber circuit comprises an internal capacitor (first capacitor or snubber capacitor) 60 coupled to the output node 10. This internal capacitor 60 is arranged to be charged during the first dead time DT1, i.e., after the low-side switching device 25 has been switched off and before the high-side switching device 20 is switched on. Further, the internal capacitor 60 is arranged to be discharged during an ON-phase of the low-side switching device 25, i.e., while the low-side switching device 25 is switched on.

The charging of the internal capacitor 60 can proceed via a charging switch (first switch) 52 that is coupled in series with the internal capacitor 60 between the output node 10 and the predetermined voltage level (e.g., ground). The charging switch 52 can be a transistor switch (first transistor switch), such as a FET (e.g., N-FET) or a MOSFET (e.g., NMOS). The charging switch 52 is switched in dependence on a voltage level V_LX at the input node 5. In particular, the charging switch 52 may be switched on if the voltage level V_LX at the input node 5 exceeds a predetermined voltage threshold. The predetermined voltage threshold may depend on (e.g., correspond to) a threshold voltage of the transistor switch implementing the charging switch 52. On the other hand, the charging switch 52 may be switched off once the low-side switching device 25 is switched on. For example, the charging switch 52 may be switched off by the low-side drive signal GATE_N, so that the charging switch 52 is switched off during ON-phases of the low-side switching device 25.

To implement the above switching scheme of the charging switch 52, the active snubber circuit 50 may comprise a sensing capacitor (second capacitor) 55 coupled between the input node 5 and a control terminal (e.g., gate terminal) of the charging switch 52. The sensing capacitor 55 senses the rising edge of the LX voltage V_LX at the input node 5 during the first dead time DT1. Thus, the sensing capacitor 55 may also be referred to as a rising edge sensing capacitor, or as tracking capacitor for tracking the voltage level V_LX at the input node 5. As soon as the tracked voltage (i.e., the voltage VN at the control terminal of the charging switch 52) is higher than the threshold voltage of the transistor switch implementing the charging switch 52, the charging switch 52 is switched on and the voltage VC at the terminal of the internal capacitor 60 that faces towards the charging switch 52 is pulled towards the predetermined voltage level (e.g., ground). Then, the inductor current IL1 charges the internal capacitor 60 until the internal capacitor 60 is fully charged. The charging current 11 for the internal capacitor 60 reduces the amount of inductor current that is passed to the parasitic inductance 32 during the first dead time DT1 and thereby also reduces the peak of the LX voltage V_LX(peak) during the first dead time DT1.

For discharging the internal capacitor 60, the active snubber circuit 50 may further comprise a discharging switch (second switch) 54 for switchably coupling an intermediate node 56 between the internal capacitor 60 and the charging switch 52 to the output node 10. The discharging switch 54 can be a transistor switch (second transistor switch), such as a FET (e.g., P-FET) or a MOSFET (e.g., PMOS). The discharging switch 54 may be arranged/coupled between the intermediate node 56 and the output node 10. Coupling said intermediate node 56 to the output node 10 (by switching the discharging switch 54 on) will pull up the voltage VC at the intermediate node 56 towards Boost_out and will discharge the internal capacitor 60 (discharge current 13). The discharging switch 54 may be switched synchronously with the low-side switching device 25, e.g., under control of the low-side drive signal GATE_N. To this end, the low-side drive signal GATE_N may be provided to the discharging switch 54 via a level shifter (e.g., lv to hv level shifter) 62. For example, the low-side drive signal GATE_N may be provided to a control terminal (e.g., gate terminal) of the transistor switch implementing the discharging switch 54 via the level shifter 62. For example, the control terminal of the low-side switching device 25 may be coupled to the control terminal of the transistor switch implementing the discharging switch 54 via the level shifter 62. The level shifter 62 may be said to shift the low-side drive signal GATE_N to the Boost_out power domain. In this configuration, the first and second switches 52, 54 can fully charge and discharge the internal capacitor 60.

In some embodiments, the active snubber circuit 50 of the switching power converter 100 may further comprise a third switch 58 coupled between the control terminal of the transistor switch implementing the charging switch 52 and the predetermined voltage level (e.g., ground). The third switch 58 can be a transistor switch (third transistor switch), such as a FET (e.g., N-FET) or a MOSFET (e.g., NMOS). The third switch may be switched synchronously with the low-side switching device 25, e.g., under control of the low-side drive signal GATE_N. To this end, the low-side drive signal GATE_N may be provided to the third switch 58. For example, the low-side drive signal GATE_N may be provided to a control terminal (e.g., gate terminal) of the transistor switch implementing the third switch 58. For example, the control terminal of the low-side switching device 25 may be coupled to the control terminal of the transistor switch implementing the third switch 58. When the low-side switching device 25 is switched on, also the third switch 58 is switched on, which pulls the voltage at the control terminal of the transistor switch implementing the charging switch 52 towards the predetermined voltage level (e.g., ground).

Thereby, the third switch 58 ensures that the charging switch 52 is switched off while the internal capacitor 60 is discharged (i.e., during ON-phases of the low-side switching device 25).

Broadly speaking, the active snubber circuit 50 can be said to comprise the internal capacitor 60, the sensing capacitor 55, and appropriate switches for charging and discharging the internal capacitor 60.

One benefit of the active snubber circuit 50 is that a small internal capacitor can be used for reducing the peak voltage V_LX(peak) during the first dead time DT1 without having to use a discrete external "snubbing" capacitor at Boost_out (as is present in the switching power converter 400 of FIG. 7).

For example, for a typical conventional switching power converter it is recommended to use small ceramic capacitors placed as close as possible to the VOUT and the GND pin of the IC. Here, dimensions of the switching power converter are assumed such that a 100 nF capacitor would be sufficient for this purpose. Assuming the same dimensions of the switching power converter, a capacitance of at most 50 pF could be used (or the capacitance could be altogether omitted in some cases) when employing an active snubber circuit according to embodiments of the disclosure. This capacitance is (at least) a factor of 2000 smaller than in the conventional switching power converter.

Examples of the operating waveforms of the switching power converter 100 are illustrated in FIG. 2. In this figure, graph 210 illustrates the low-side drive signal GATE_N, graph 220 illustrates the high-side drive signal GATE_P, graph 230 illustrates the inductor current IL, 240 illustrates the voltage VX at the output node 10, graph 250 illustrates the voltage V_LX at the input node 5, graph 260 illustrates the voltage VN at the control terminal of the transistor switch implementing the charging switch 52, and graph 270 illustrates the voltage VC at the intermediate node 56 between the internal capacitor 60 and the charging switch 52.

During operation of the switching power converter 100, the sensing capacitor 55 of the active snubber circuit 50 tracks the voltage V_LX at the input node 5 (voltage VN according to graph 260). During the first dead time DT1 between T0 and T2, after the low-side switching device 25 has been switched off (low-side drive signal GATE_N LOW in graph 220) the voltage VN will rise. Once it reaches the threshold voltage of the transistor switch implementing the charging switch 52 (this is the case at timing T1 in the present example), the charging switch 52 will switch on and the voltage VC at the intermediate node 56 (graph 270) will be pulled down. This will charge the internal capacitor 60. Charging the internal capacitor 60 at this point will reduce the further rise of the LX voltage V_LX (graph 250, dashed line), thus leading to a lower peak voltage V_LX(peak) than would be the case without active snubber circuit (solid line in graph 250). Likewise, the voltage VX (graph 240) at the output node 10 is reduced by the charging of the internal capacitor 60. Once the low-side switching device 25 is switched on again at timing T4 (low-side drive signal GATE_N toggles from LOW to HIGH), the discharging switch 54 is switched on to discharge the internal capacitor 60 and the voltage VC (graph 270) at the intermediate node 56 will rise to Boost_out again.

The reduction of the peak voltage V_LX(peak) may be dependent on the internal snubbing capacitance (i.e., the capacitance of the internal capacitor). Higher peak reduction needs a bigger capacitor area. A suitable low voltage rate FET for the low-side switching device and an appropriate internal capacitance can be selected in accordance with design specification.

Figure 3:
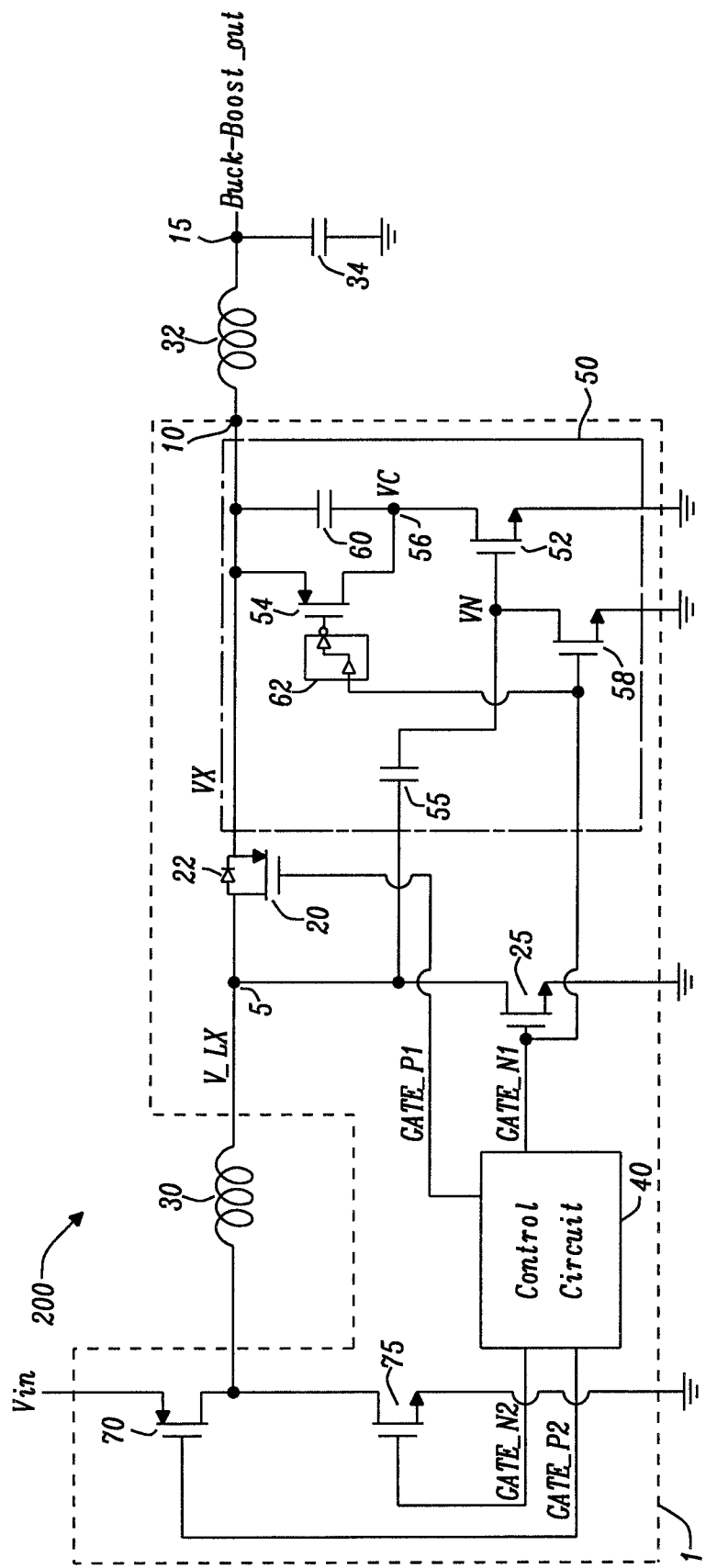

As noted above, the present disclosure can also be applied to a buck-boost converter as an example of the switching power converter. FIG. 3 schematically illustrates an example of a buck-boost converter 200 (as an example of a switching power converter) according to embodiments of the disclosure.

In addition to the elements of the switching power converter 100 described above, the switching power converter 200 comprises a second high-side switching device 70 and a second low-side switching device 75 coupled in series between an input voltage VIN and the predetermined voltage level (e.g., ground). Both the second high-side switching device 70 and the second low-side switching device 75 operate under control of the control circuit 40 that provides (e.g., generates) a second high-side drive signal GATE_P2 for the second high-side switching device 70 and a second low-side drive signal GATE_N2 for the second low-side switching device 75. The second high-side switching device 70 and the second low-side switching device 75 may be transistors, such as FETs. For example, the second high-side switching device 70 may be a P-FET and the second low-side switching device 75 may be a N-FET. In particular, the second high-side switching device 70 and the second low-side switching device 75 may be MOSFETs, i.e., the second high-side switching device 70 may be a PMOS and the second low-side switching device 75 may be a NMOS. In such case, the control circuit 40 may be coupled to respective control terminals (e.g., gates) of the second high-side switching device 70 and the second low-side switching device 75, to provide the second high-side drive signal GATE_P2 to the control terminal of the second high-side switching device 70 and to provide the second low-side drive signal GATE_N2 to the control terminal of the second low-side switching device 75.

An intermediate node between the second high-side switching device 70 and the second low-side switching device 75 is coupled to the LX node 5 via the input inductance 30. The input voltage VIN is provided to a source terminal of the second high-side switching device 70.

It should further be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A switching power converter for receiving an input power at an input node and outputting an output power at an output node, the switching power converter comprising:
a high-side switching device coupled between the input node and the output node;
a low-side switching device coupled between the input node and a predetermined voltage level; and
an active snubber circuit for suppressing voltage peaks at the input node,
wherein the active snubber circuit comprises a first capacitor coupled to the output node;
wherein the first capacitor is charged during a first dead time after the low-side switching device has been switched OFF and before the high-side switching device is switched ON;
wherein the active snubber circuit comprises a series connection of the first capacitor and a first switch coupled between the input node and the predetermined voltage level;
wherein the first switch is switched in dependence on a voltage level at the input node;
wherein the switching power converter further comprising a second switch for switchably coupling an intermediate node between the first capacitor and the first switch to the output node, so that the first capacitor is discharged if the second switch is switched ON;
wherein the second switch is switched synchronously with the low-side switching device; and
wherein the second switch is a second transistor switch and wherein a control terminal of the second transistor switch is coupled to a control terminal of the low-side switching device through a level shifter.

2. The switching power converter according to claim 1, wherein the first capacitor is discharged during an ON-phase of the low-side switching device.

3. The switching power converter according to claim 1, wherein the first switch is switched ON if the voltage level at the input node exceeds a predetermined voltage threshold.

4. The switching power converter according to claim 1, wherein the first switch is switched OFF if the low-side switching device is switched ON.

5. The switching power converter according to claim 1, wherein the first switch is a first transistor switch; and
wherein the switching power converter further comprises a second capacitor coupled between the input node and a control terminal of the first transistor switch.

6. The switching power converter according to claim 1, wherein the switching power converter is one of a synchronous boost converter or a buck-boost converter.

7. A switching power converter for receiving an input power at an input node and outputting an output power at an output node, the switching power converter comprising:
a high-side switching device coupled between the input node and the output node;
a low-side switching device coupled between the input node and a predetermined voltage level; and
an active snubber circuit for suppressing voltage peaks at the input node,
wherein the active snubber circuit comprises a first capacitor coupled to the output node;
wherein the first capacitor is charged during a first dead time after the low-side switching device has been switched OFF and before the high-side switching device is switched ON;
wherein the active snubber circuit comprises a series connection of the first capacitor and a first switch coupled between the input node and the predetermined voltage level;
wherein the first switch is switched in dependence on a voltage level at the input node;
wherein the first switch is a first transistor switch;
wherein the switching power converter further comprises a third switch coupled between a control terminal of the first transistor switch and the predetermined voltage level; and
wherein the third switch is switched synchronously with the low-side switching device.

8. The switching power converter according to claim 7, wherein the third switch is a third transistor switch and wherein a control terminal of the third transistor switch is coupled to a control terminal of the low-side switching device.

9. A method, using a switching power converter, of receiving an input power at an input node and outputting an output power at an output node, wherein the switching power converter comprises a high-side switching device coupled between the input node and the output node, a low-side switching device coupled between the input node and a predetermined voltage level, and an active snubber circuit with a first capacitor coupled to the output node, the method comprising the steps of:

charging the first capacitor during a first dead time after the low-side switching device has been switched OFF and before the high-side switching device is switched ON, so that voltage peaks at the input node are suppressed;

wherein the active snubber circuit comprises a series connection of the first capacitor and a first switch coupled between the input node and the predetermined voltage level;

wherein the method further comprises the step of:

switching the first switch in dependence on a voltage level at the input node;

wherein the switching power converter further comprising a second switch for switchably coupling an intermediate node between the first capacitor and the first switch to the output node, so that the first capacitor is discharged if the second switch is switched ON;

wherein the method further comprises the step of:

switching the second switch synchronously with the low-side switching device; and wherein the second switch is a second transistor switch and wherein a control terminal of the second transistor switch is coupled to a control terminal of the low-side switching device through a level shifter.

10. The method according to claim 9, further comprising the step of:

discharging the first capacitor during an ON-phase of the low-side switching device.

11. The method according to claim 9, wherein the first switch is switched ON if the voltage level at the input node exceeds a predetermined voltage threshold.

12. The method according to claim 9, wherein the first switch is switched OFF if the low-side switching device is switched ON.

13. The method according to claim 9, wherein the first switch is a first transistor switch; and wherein the method further comprises the step of:

tracking a voltage level at the input node by a second capacitor coupled between the input node and a control terminal of the first transistor switch.

14. The method according to claim 9, wherein the switching power converter is one of a synchronous boost converter or a buck-boost converter.

15. A method, using a switching power converter, of receiving an input power at an input node and outputting an output power at an output node, wherein the switching power converter comprises a high-side switching device coupled between the input node and the output node, a low-side switching device coupled between the input node and a predetermined voltage level, and an active snubber circuit with a first capacitor coupled to the output node, the method comprising the steps of:

charging the first capacitor during a first dead time after the low-side switching device has been switched OFF and before the high-side switching device is switched ON, so that voltage peaks at the input node are suppressed;

wherein the active snubber circuit comprises a series connection of the first capacitor and a first switch coupled between the input node and the predetermined voltage level;

wherein the method further comprises the step of:

switching the first switch in dependence on a voltage level at the input node;

wherein the first switch is a first transistor switch and wherein the switching power converter further comprises a third switch coupled between a control terminal of the first transistor switch and the predetermined voltage level; and wherein the method further comprises the step of:

switching the third switch synchronously with the low-side switching device.

16. The method according to claim 15, wherein the third switch is a third transistor switch and wherein a control terminal of the third transistor switch is coupled to a control terminal of the low-side switching device.

* * * * *